United States Patent [19]

Graham, III

[11] 4,269,690

[45] May 26, 1981

[54] ELECTROLYTIC APPARATUS FOR RECLAIMING DISSOLVED METAL FROM LIQUID

[75] Inventor: James M. Graham, III, Westminster, Md.

[73] Assignee: Nancy Swartz Hammond, Baltimore, Md.

[21] Appl. No.: 116,191

[22] Filed: Jan. 28, 1980

[51] Int. Cl.³ .......................... C25C 7/00; C25C 7/02
[52] U.S. Cl. .................................. 204/272; 204/275; 204/286
[58] Field of Search ............... 204/271, 272, 275–277, 204/109, 286

[56] References Cited

U.S. PATENT DOCUMENTS

| 1,440,091 | 12/1922 | Long | 204/272 |
| 3,583,897 | 6/1971 | Fulweiler | 204/109 X |
| 3,663,416 | 5/1972 | Cooper et al. | 204/271 X |
| 4,054,503 | 10/1977 | Higgins | 204/271 |

Primary Examiner—D. R. Valentine
Attorney, Agent, or Firm—Pollock, Vande Sande & Priddy

[57] ABSTRACT

An improved apparatus is disclosed for reclaiming dissolved metal from a liquid, in which a pail or similar container (10) is provided with at least one pair of nested, concentric cylindrical metal cathodes (16, 34) with an anode rod (40) located concentric with the central cathode (34) and a plurality of anode rods (38) located in the annulus between the cathodes (16, 34). Liquid containing metal to be reclaimed is introduced by gravity feed at a location (20) near the bottom of the container (10) so that when a voltage is applied between the cathodes (16, 34) and anodes (38, 40), the dissolved metal plates out on the cathodes (16, 34) and essentially metal-free liquid may be drawn off at a location (22) near the upper portion of the container.

19 Claims, 4 Drawing Figures

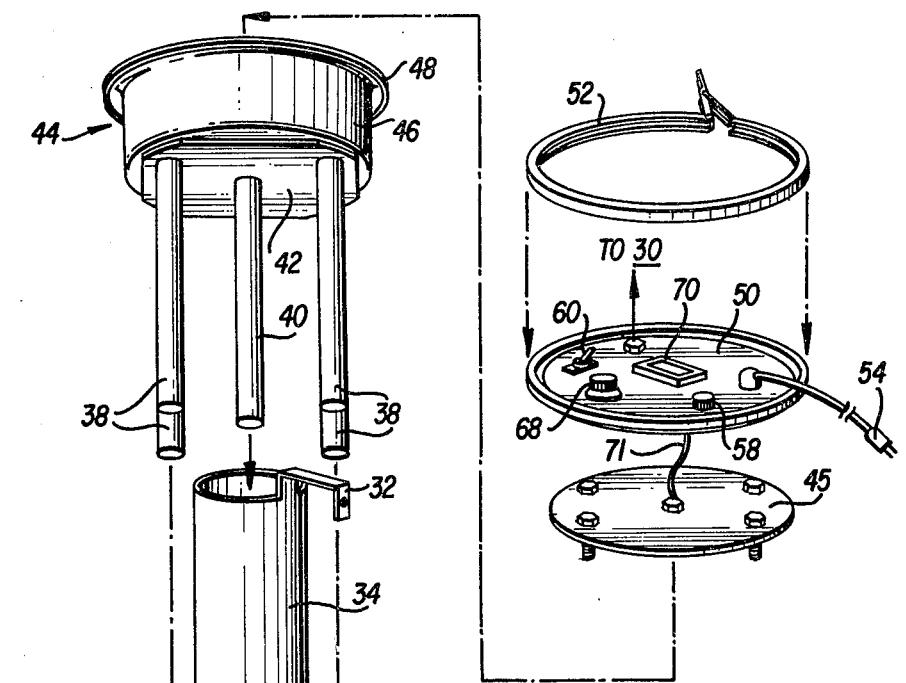
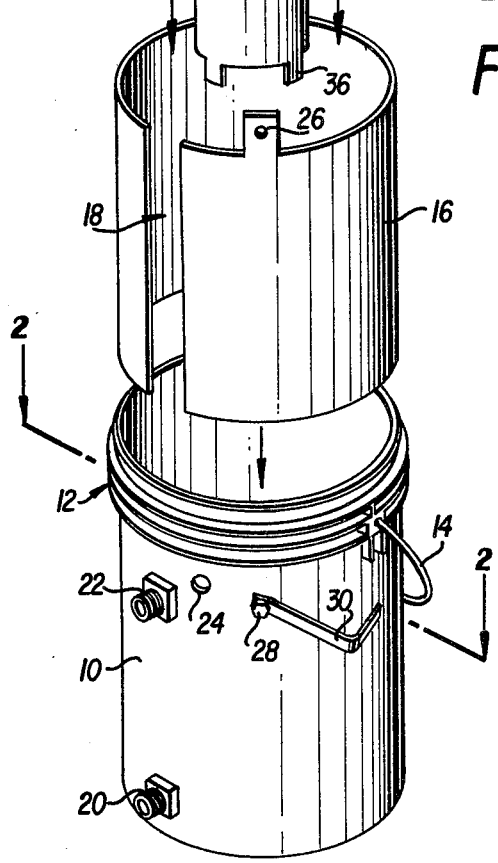
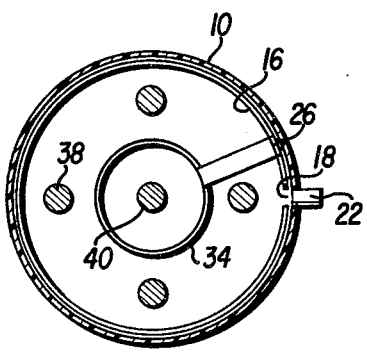
FIG. 1
FIG. 2 to# ELECTROLYTIC APPARATUS FOR RECLAIMING DISSOLVED METAL FROM LIQUID

DESCRIPTION

1. Technical Field

The present invention relates to the electrolytic recovery of metals from liquids in which the metals are dissolved, of the general type in which a direct current voltage is applied between at least one anode and cathode pair located in the liquid, so that the metal plates out on the cathode, thereby facilitating its reclamation.

2. Background Art

During the developing of photographic and x-ray films, for example, silver compounds become dissolved in the fixing solution to such an extent that the presence of the silver reduces the effectiveness of the solution. It is known to remove silver electro-chemically from the spent fixing solution and thus provide a silver-free solution which then can be replenished by the addition of suitable quantities of fixing chemicals.

Depending upon the volume of liquid to be processed, various techniques have been used in the past to reclaim the silver. One system is described in U.S. Pat. No. 3,003,942 issued to Cedrone in which rather high current densities and constant physical agitation of the liquid are required for a rather complex apparatus which apparently would require significant supervision and maintenance. Reclamation units have also been used which include a tank containing alternate cathode and anode plates and will recover silver at low current densities without agitation of the liquid; however, such prior art devices have been of considerable physical size in order to provide adequate cathode area. One example of a reclamation system in which a substantial reduction in size was achieved is disclosed in U.S. Pat. No. 3,767,558 issued to Rowe. Nonetheless, due to its rather complex cathode geometry, removal of plated silver from the Rowe apparatus apparently would be somewhat difficult.

Typically, the electrolytic reclamation devices currently available have been designed for use with high volume photographic processing systems which produce substantially more than, for example, 50 troy ounces of silver per month. Processors or other operations which produce less than this amount of silver usually have been serviced with a type of steel wool canister in which reclamation is achieved by a metallic exchange process. Such canister installations have a number of known disadvantages such as the cost of cartridge replacement, the higher cost of the small amount of silver reclaimed, the geometric lessening of efficiency of the cartridge with each day of use and the lack of precise knowledge of the quantity of silver recovered.

DISCLOSURE OF THE INVENTION

An object of the present invention is to provide a metal reclamation apparatus which is simple, rugged and easy to use, particularly in low volume applications.

Another object of the invention is to provide such an apparatus in which agitation of the solution is not required during operation and very low current densities can be used to avoid sulfiding at the cathodes.

A further object of the present invention is to provide such an apparatus in which the cathodes and anodes, liquid container, power supply and associated controls are all provided in a compact, integrated easily transported package.

Yet another object of the invention is to provide such an apparatus in which the various components are readily available commercially, thereby minimizing the cost of the apparatus.

These objects are given only for example; thus, other desirable objectives and advantages inherently achieved by the present invention may occur to those skilled in the art. Nonetheless, the scope of the invention is to be limited only by the appended claims. The above objectives and other advantages are achieved by a preferred embodiment of the invention in which a container having a lower liquid inlet and an upper liquid outlet is provided with at least one pair of substantially imperforate cylindrical cathodes located concentrically within the container. The term "substantially imperforate" as used in this application means that the cathode surfaces are free or nearly free of perforations through the thickness of the cathode, which is to be distinguished from the wire mesh or screen cathodes known in the prior art. Substantially imperforate cathodes are preferred since silver removal is easier than with the perforated type. A plurality of carbon anode rods are suspended at least between the cathodes and a source of power is included for applying electrical potential between the cathodes and the anode rods. To facilitate operation of the apparatus using gravity feed of the liquid to be processed, a source of liquid containing trace metals is provided which has an overflow opening located above the liquid outlet of the container and a conduit connecting this overflow opening to the liquid inlet of the container. The opening of the container is closed by a closure element having depending side walls and a bottom wall from which the anode rods are suspended. Within the volume defined by the depending side walls and bottom wall are located at least a portion of the components of the power supply for the apparatus, these components in turn being suspended from a cover which extends across the upper portion of the closure.

BRIEF DESCRIPTION OF THE DRAWINGS

FIG. 1 shows an exploded, perspective view of an apparatus for reclaiming metal according to the present invention, indicating the manner in which the various components of the invention are assembled.

FIG. 2 shows a section view taken along Line 2—2 of FIG. 1, assuming the apparatus to have been assembled, indicating the spatial relation of the anodes and cathodes.

BEST MODE FOR CARRYING OUT THE INVENTION

Figure 3:
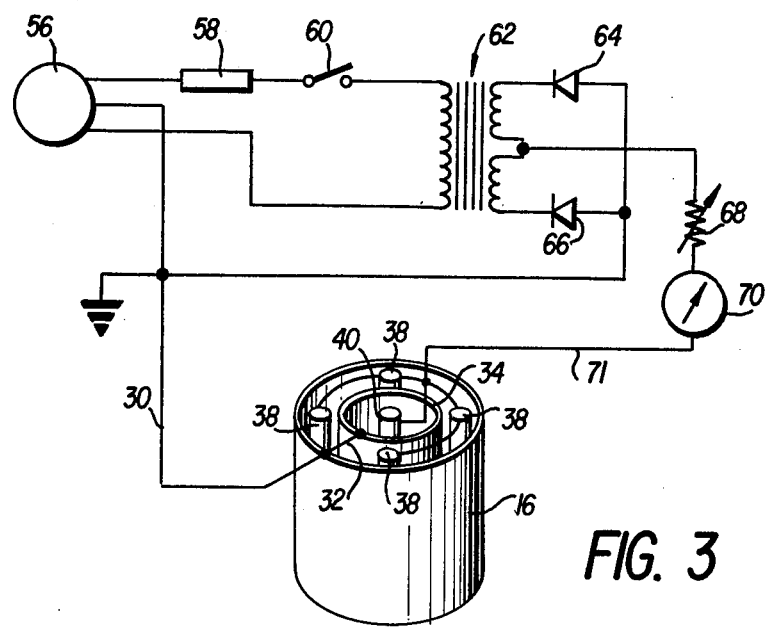
FIG. 3 shows a schematic view of the power supply used in the invention.

The following is a detailed description of the preferred embodiment of the invention, reference being made to the drawings in which like reference numerals identify like elements of structure in each of the several figures.

Referring to FIGS. 1 and 2, the invention comprises a pail 10 or other suitable container made from an electrically insulating material such as polyvinylchloride plastic. The thickness of the container walls is chosen so that the container is rigid enough not to deform significantly should it have to be moved while full of liquid. A plurality of reinforcing circumferential flanges 12 are provided about the portion of the container near a pair of diametrically opposed bosses which pivotably support a bail 14 in a conventional manner. A first cylindrical cathode 16 is located within pail 10 and is of essentially the same diameter as the inner diameter of the pail so that the cathode fits rather closely to the wall of the pail. Preferably, cathode 16 is made from a material such as 316 stainless steel or Monel sheet and is substantially imperforate. The use of plain, flexible steel sheet is preferred since it facilitates removal of the silver which plates out on the cathode. An axially extending opening 18 is provided between the ends of the sheet which forms cathode 16, the opening being positioned circumferentially in the assembled apparatus so as to align with a liquid inlet 20 located in the lower portion of pail 10 and a liquid outlet 22 located in the upper portion of pail 10, just at or somewhat below the upper edge of cathode 16. The provision of opening 18 also permits flexing cathode 16 toward an open, flattened configuration, thereby simplifying removal of plated silver which often tends to pop off when the cathode is flexed. While inlet and outlet openings 20, 22 are illustrated as being on the same side of pail 10, those skilled in the art will realize that these openings could also be located at different circumferential positions on the pail, provided cathode 16 includes an appropriate opening to allow liquid flow into or from the container. An overflow hole 24 is provided through the wall or pail 10 just above the top of liquid outlet 22 so that should liquid enter the pail faster than outlet 22 can allow it to flow away, the excess can flow out hole 24 before the liquid level rises to the top of the container where damage to the power supply could be expected.

An apertured connector tab 26 extends upwardly from the upper edge of cathode 16 in position to receive a bolt 28 which extends through the side of pail 10. The lower end of a ground strap 30 also is secured by bolt 28 and the upper end of strap 30 is electrically connected to the power supply used in the invention, as will be discussed subsequently. Bolt 28 also extends through an apertured connector strap 32 which extends radially from a concentric cylindrical cathode 34 situated within cathode 16. Cathode 34 is approximately half the diameter of cathode 16; is made from the same material as cathode 16; and includes several downwardly extending legs 36 to support it above the bottom of pail 10. The height of cathode 34 is somewhat less than that of cathode 16, to permit liquid flow outward over its upper edge to outlet 22.

A plurality of carbon or graphite anode rods 38, 40 are affixed to an insulator plate 42 which is suspended from the bottom of a bowl-like closure 44 by fasteners extending through the bottom of closure 44 from a steel plate 45 located on the closure bottom. Closure 44 is made from a suitable electrically insulating material and its bowl-like shape is defined by a downwardly depending circumferential side wall 46 having an upper peripheral lip 48, the lip being sized to fit over the upper lip of pail 10, and the flat bottom wall which supports anode rods 38, 40.

Cathodes 16 and 34 and anode rods 38, 40 are positioned so that the average radial spacing of each anode rod to its adjacent cathode or cathodes is essentially the same as that of all other anode rods. Approximately 1.5 to 2.5 inches average spacing is preferred. Rods 38 thus are centered in the annulus between cathodes 16 and 34 and rod 40 is concentric with cathode 34. By "average spacing" is meant that for a given location on anodes 38, 40, the average of the distances measured in one horizontal plane from that location to the adjacent cathode or cathodes is approximately 1.5 to 2.5 inches. This geometry also provides even current distribution over the face of the cathodes, thus ensuring rather even build up of silver and preventing "hot spots" which could cause local sulfiding. While only two cylindrical cathodes are shown, the use of 3 or more, plus additional anode rods located between them, is also within the scope of the invention. Such geometries are useful for higher capacity systems.

Closure 44 thus defines an upwardly opening bowl or volume which is closed by a cover 50 secured to pail 10 by means such as clamping ring 52 which clamps peripheral lip 48 between cover 50 and the lip of pail 10. The volume thus defined by closure 44 and closed by cover 50 receives the lower portion of various elements of the power supply which are supported on cover 50 and protects them from damage due to ambient conditions or the liquid being processed. The arrangement is also quite compact and completely self-contained. Referring to FIGS. 1 and 3, it is seen that the three-prong plug 54 delivers alternating current from a suitable power source 56, such as a conventional wall socket. The alternating current flows in series through a fuse 58, and on-off switch 60 and the primary coil of a transformer 62 before returning to source 56. The secondary coils of transformer 62 are connected to diodes 64, 66 so that through a conventional center top arrangement, rectified direct current is delivered to potentiometer 68 and direct current ammeter 70. From ammeter 70, the current flows through a conductor 71 to all of the anode rods 38, 40 via steel plate 45. The current then passes through the processed liquid in pail 10 to cathode 16, 34 and back to ground.

Figure 4:
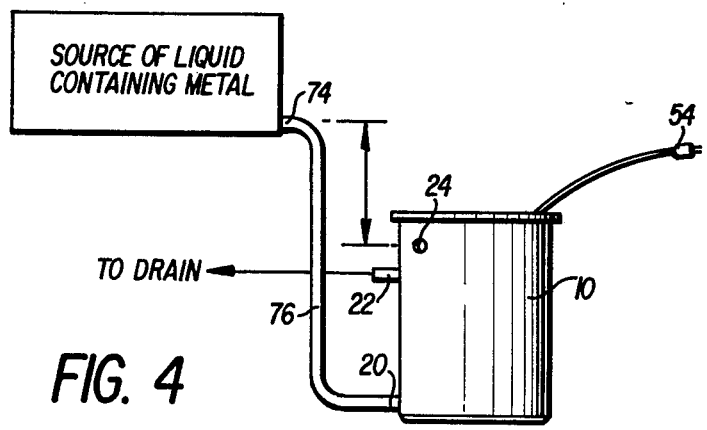
FIG. 4 shows a schematic view of the reclamation apparatus according to the invention as connected to a source of liquid containing trace metals.

Referring now to FIG. 4, the apparatus according to the invention is typically used in combination with a tank or other source 72 of liquid to be processed which is positioned with its delivery or overflow opening 74 at least one to two inches above the overflow hole 24 of pail 10. A plastic conduit 76 is connected between opening 74 and inlet 20 so that gravity feed of the liquid is established into pail 10. The rate of feed will vary somewhat depending on how quickly spent liquid is added to source 72, but is typically rather slow. Outlet opening 22 is connected to a drain.

In one actual embodiment of the invention, pail 10 was a six-gallon, polyethylene plastic bucket of approximately 11.25 inches in diameter and 16.5 inches inner depth. Cathode 16 was 11.25 inches in diameter and 11.75 inches high; whereas cathode 34 was 5.0 inches in diameter and 10.0 inches high including legs 36 which provided a one inch spacing from the bottom of pail 10. Anode rods 38, 40 were solid carbon rods of 1 inch diameter and 12 inch length, thus providing approximately $\frac{1}{4}$ inch clearance at the bottom of the container, to provide space for silver which may slough off the cathodes in use, and thus prevent short circuiting by such silver. Closure 44 was approximately 4.25 inches high, thus providing an adequate volume for reception of the components of the power supply.

Experience has shown that the apparatus according to the invention is economical to operate even in cases where as little as 5 troy ounces of silver are being recovered. To reduce the cost of the unit, only gravity feed is required, so that low current densities of about 0.25 amp/ft² are used to prevent sulfiding. To reclaim approximately 30 ounces per month, at this rate, a cathode area of about 4.0 square feet is needed, with an anode area of at least 20% of the cathode area, or about 0.8 square feet. Usuing commerically available pails for container 10 and commercially available sizes of graphite rod for anodes 38, 40, the cylindrical cathode sizes may be chosen to provide the required area and length and number of anodes may be determined.

Assuming that the reclaiming apparatus according to the invention is to be used with an automatic photographic processor, the apparatus is connected as illustrated in FIG. 4 and container 10 is permitted to fill to its overflow. At this point, plug 54 is connected to a convenient electrical outlet and switch 60 is closed. Potentiometer 68 is then adjusted so that ammeter 70 indicates approximately 1.5 amperes or such other current level as found to be necessary to achieve good plating on cathodes 16, 34. In actual practice, a maximum of 2 amperes has been found to be preferable. Because there is no agitation, the silver laden liquid tends to stratify close to the bottom of the container, thus displacing desilvered liquid which runs out through opening 22. Due to the low current density used in the present invention, a few weeks may be required before sufficient silver has been plated on the cathodes to warrant removal from the apparatus. When removal is desired, the device is disconnected from its power source, clamping ring 52 is removed thus permitting cover 50 and the power supply to be removed from the reclaimer. Closure 44 is then lifted from pail 10 along with anode rods 38, 40. The cathodes 16, 34 may then be withdrawn following removal of bolt 28. Any silver which has fallen from the cathodes will be in the bottom of pail 10 where it may be removed using a cup. Then, a plastic scraper or putty knife may be used to remove the silver from the cathodes for collection and weighing.

INDUSTRIAL APPLICABILITY

The invention has been described with particular references to the reclamation of silver from photographic processing liquids; however, those skilled in the art will realize that it may also be used for the recovery of other metals from solutions of other types.

Having disclosed my invention in sufficient detail to enable those skilled in the art to make and use it, I claim:

1. An improved electrolytic apparatuss for reclaiming trace metals from liquids, comprising:
   a container having an opening at its upper end;
   a first substantially imperforate stationary cylindrical cathode located within said container in proximity to the side wall thereof;
   a second substantially imperforate stationary cylindrical cathode located concentrically within said first cathode;
   a plurality of stationary anode rods;
   means for suspending said anode rods at least between said first and second cathodes; and
   means for applying a voltage between said first and second cathodes, and said plurality of anode rods.

2. Apparatus according to claim 1, further comprising a liquid overflow opening through the wall of said container above said liquid outlet.

3. Apparatus according to claim 1, further comprising a liquid inlet through the wall of said container; a liquid outlet through the wall of said container at a location above said liquid inlet; a source for liquid bearing trace metals, said source having a discharge opening located above said liquid outlet, and a conduit connecting said discharge opening to said liquid inlet, whereby gravity feed of liquid to said apparatus is achieved.

4. Apparatus according to claim 3, wherein said discharge opening is from one to two inches above said liquid outlet.

5. Apparatus according to claim 3, wherein said first cylindrical cathode extends between said liquid inlet and outlet and comprises at least one opening for permitting flow of liquid through said inlet and outlet.

6. Apparatus according to claim 1, wherein one of said anode rods is suspended within said second cylindrical cathode.

7. Apparatus according to claim 1, wherein said first and second cylindrical cathodes stand on the bottom of said container, said second cathode comprising a plurality of downwardly extending, circumferentially spaced feet, whereby liquid flow is permitted into the interior of said second cathode.

8. Apparatus according to claim 7, wherein said second cylindrical cathode is shorter than said first cylindrical cathode, to facilitate flow of liquid to said outlet.

9. Apparatus according to claim 1, wherein said means for suspending comprises a closure for said container, said anode rods being attached to the underside of said closure.

10. Apparatus according to claim 9, wherein said container comprises a cylindrical pail of electrically insulative material, said pail having a lip surrounding said upper end, said closure being supported by said lip.

11. Apparatus according to claim 10, wherein said closure comprises a depending side wall and a bottom wall from which said anode rods are suspended, further comprising a cover extending across said closure and clamping said closure between said lip and said cover, said means for applying a voltage being supported by said cover and isolated by said closure from the interior of said container.

12. An improved electrolytic apparatus for reclaiming trace metals from liquids, comprising:
   a container having an opening at its upper end;
   a liquid inlet through the wall of said container;
   a liquid outlet through the wall of said container at a location above said liquid inlet;
   a first substantially imperforate, stationary cylindrical cathode standing on the bottom of said container and in proximity to the side wall thereof, said first cathode extending between said inlet and said outlet and comprising at least one opening for permitting flow of liquid through said inlet and said outlet;
   a second substantially imperforate, stationary cylindrical cathode concentrically within said first cathode, said second cathode comprising a plurality of downwardly extending, circumferentially spaced feet, whereby liquid flow is permitted into the interior of said second cathode;
   a plurality of anode rods;
   means for suspending at least one of said anode rods within said second cathode and the remainder of said anode rods between said first and second cathodes; and
   means for applying a voltage between said first and second cathodes, and said plurality of anode rods.

13. Apparatus according to claim 12, further comprising a liquid overflow opening through the wall of said container above said liquid outlet.

14. Apparatus according to claim 12, further comprising a source for liquid bearing trace metals, said source having an overflow opening located above said liquid outlet, and a conduit connecting said overflow opening to said liquid inlet, whereby gravity feed of liquid to said apparatus is achieved.

15. Apparatus according to claim 14, wherein said overflow opening is from one or two inches above said liquid outlet.

16. Apparatus according to claim 12, wherein said means for suspending comprises a closure for said container, said anode rods being attached to the underside of said closure.

17. Apparatus according to claim 16, wherein said container comprises a cylindrical pail of electrically insulative material, said pail having a lip surrounding said upper end, said closure being supported by said lip.

18. Apparatus according to claim 17, wherein said closure comprises a depending side wall and a bottm wall from which said anode rods are suspended, further comprising a cover extending across said closure and clamping said closure between said lip and said cover, said means for applying a voltage being supported by said cover and isolated by said closure from the interior of said container.

19. Apparatus according to claim 12, wherein said second cylindrical cathode is shorter than said first cylindrical cathode, to facilitate flow of liquid to said outlet.

* * * * *